United States Patent [19]

Howe et al.

[11] Patent Number: 4,809,317

[45] Date of Patent: Feb. 28, 1989

[54] TELEPHONE LINE EXCLUSION DEVICE

[76] Inventors: Paul R. Howe, 3708 E. Dover Stravenue, Tucson, Ariz. 85706; Michael D. Morris, 9272 E. Bidahochi Dr., Tucson, Ariz. 85749

[21] Appl. No.: 41,236

[22] Filed: Apr. 22, 1987

[51] Int. Cl.$^4$ .................. H04M 11/00; H04M 1/68
[52] U.S. Cl. ........................... 379/98; 379/93; 379/184
[58] Field of Search ............... 379/93, 95, 96, 97, 379/98, 442, 443, 106, 107, 161, 168, 184, 194, 195

[56] References Cited

U.S. PATENT DOCUMENTS

| | | | |
|---|---|---|---|
| 3,517,137 | 6/1970 | Ribner | 379/93 |
| 4,000,375 | 12/1976 | Kawamura | 379/184 |
| 4,306,116 | 12/1981 | McClure et al. | 379/98 X |
| 4,367,374 | 1/1983 | Serrano | 379/93 X |
| 4,378,470 | 3/1983 | Murto et al. | 379/97 |
| 4,394,540 | 7/1983 | Willis et al. | 379/107 X |
| 4,444,999 | 4/1984 | Sparrevohn | 379/380 X |
| 4,469,917 | 9/1984 | Shelley | 379/107 X |
| 4,591,662 | 5/1986 | Legros et al. | 379/96 X |
| 4,596,021 | 6/1986 | Carter et al. | 379/98 |
| 4,604,499 | 8/1986 | Hughes | 379/95 |
| 4,640,988 | 2/1987 | Robinton | 379/37 X |
| 4,660,218 | 4/1987 | Hashimoto | 379/93 |

Primary Examiner—Keith E. George
Attorney, Agent, or Firm—J. Michael McClanahan

[57] ABSTRACT

A device is disclosed for use on a telephone line where there is two or more telephones or other instruments connected in parallel to the same telephone line whereby when one of the instruments goes off-hook (in a telephone, raises the receiver) the telephone line exclusion device automatically locks out all other instruments connected in parallel with the instrument that went off-hook. Such a result is achieved by a pair of interconnected two-coil polarized normally closed reed relays which interface the incoming telephone line and the two instruments. The two lines which normally connect to each instrument on the telephone line utilizes the normally closed contacts of one relay to energize the coils of the other relay and thereby inhibit the other instrument on the telephone line by opening the normally closed contact of the second relay which is in line with the other instrument. Upon the first instrument going on-hook (in a telephone, returning the receiver to the cradle), the telephone line exclusion device returns to its quiescent state where either instrument upon the line may be utilized.

10 Claims, 1 Drawing Sheet

TELEPHONE LINE EXCLUSION DEVICE

BACKGROUND OF THE INVENTION

1. FIELD OF THE INVENTION

The field of the invention is devices that are placed on telephone lines to inhibit multiple instruments on the telephone line from interfering with each other.

2. DESCRIPTION OF THE RELATED ART

With the advent of so many different instruments which are adapted to attach to telephone lines, problems have developed with respect to interference between these different instruments when they are connected in parallel on a single telephone line. For example, it is common in business offices, and to some extent, in residential homes, to have multiple telephones on a single incoming telephone line or each to have access to the same telephone line, as well as other instruments, such as modems which permit attached computers to communicate with remote computers by sending and receiving data on the telephone line.

With the use of high speed modems, such as the 1200, 2400, or more baud modems, data is sent over telephone lines at an ever increasing rate. In order for the data to be free of distortions, it is preferable to have a single line dedicated to the computer. However, leasing a telephone line solely for a computer may be rather expensive so it has become common practice to use the common telephone line and to share it with the office telephones and other instruments.

However, results of using shared telephone lines by computers have resulted in distorted data being sent and received if a telephone or other device on the telephone line goes off-hook (receiver is picked up) during the time of data transmission. This injects electrical spikes and voltage fluctuations into the telephone line which distorts the data being sent and received by the modems resulting in error or, in some cases, even having the modems terminate transmission.

It is common in situations where different instruments are on a common telephone line to place mechanically operated switches, preferably near the computer, which switch the telephone lines to the computer modem and switch out all other parallel telephones or other instruments connected to the line. This type of operations works well and does reserve the telephone line pair for the computer while the switch is holding the telephone line in that position, however, it does create problems if the computer operator neglects to re-position the switch back to the telephones or other instruments on the line after computer transmission is completed. If the telephone line computer switch is located in another room from the party seeking to use a telephone after computer use, and the switch has been left in the computer position, this requires that the party desiring to use the telephone or other instrument travel to the switch and put it in the correct position. Further, if one party is using telephone without the knowledge of the second party, and the second party has access to the telephone line computer switch, the first party will be cut off as the switch is operated to the computer position.

In addition, other applications of the telephone line switch have been in commercial establishments, such as restaurants, where the proprietor has a public telephone on his business telephone line, and the proprietor makes the public telephone available whenever he is not using the line. If the telephone line switch is located near the proprietor's telephone, his forgetting to return the switch to the pay telephone line while his own telephone is not in use will result in lost revenues since the pay telephone is dead.

Obviously then, there is a need for a device which will, upon any instrument connected to the telephone line line going off-hook (being readied for use) to inhibit the operation of all other instruments similarly connected to that same telephone line in order that no other instruments on the line may interfere with the instrument being used, and which device returns the telephone line to use by any of the paralleled instruments on the line after use of the first instrument on the line.

This and other objects and needs are set out in the enclosed specification of the Applicant's invention.

SUMMARY OF THE INVENTION

The embodiment of the invention described consists of a pair of two-coil normally closed contact reed relays operably interconnected and interfaced between the incoming telephone line and a pair of instruments, such as telephones, computer modems, or the like, attached to the same telephone line. The subject telephone line exclusion device operates by permitting either of a pair of instruments, telephone, computer modem, or the like, connected to it to exclude the other from coming on line by use of the first. Such is accomplished without the use of switches, and either of the two instruments on the telephone line may be the first used instrument. Termination of the use of the first used instrument returns the system to its quiescent state.

The incoming telephone line necessary to permit operation of telephones, computer modems, or the like, consists of two lines, a tip and a ring line. Normally, when the telephone or other device is on-hook (receiver down), no dc path is provided through the telephone for the tip and ring lines and the open circuit voltage at the telephone is nominally 48 volts dc with the tip side being positive and the ring side being negative (or the return). When the telephone or other device goes off-hook (receiver picked up), resistance is placed between the ring and tip lines and the dc voltage nominally drops to about 8 volts dc. Upon this dc voltage is impressed the dial tone. When a telephone is on-hook and rings, a 105 volt 30-cycle square wave is sent over the lines which passes a capacitor in the telephone set to the ringer which rings the bell which is heard. At that time, the phone receiver is picked up, and goes off-hook (telephone is placed in use).

The relays which are utilized in the invention are commercially available reed type relays having normally closed contacts utilizing a pair of polarized coils to open the contacts. The coils are additive in their effect and must be connected so that the dotted side of each coil is connected to the positive side of the supplied dc voltage. The device is constructed to place the tip line to both the normally closed contacts of each relay at which time the lines are continued to one of the two coils of each opposite relay. Passing each relay coil, the lines then go to each of the two separate instruments as the tip line. The ring line then is directed to both the unconnected second coils on each of the relays where, after passing that second coil of each relay, then is directed to each of the pair of telephones or other instruments on the line as the ring side.

The device operates when the first of the two telephones or other devices on the line goes off-hook and thus completes the circuit between that particular instrument's tip and ring lines. At this time, the tip line through the normally closed relay contacts energizes the first coil of one of the relays while the ring line energizes the second coil of the same relay in order that both coils of the same relay are now properly energized causing its contacts to go into the open position. At this, the other telephone or device on the line, having its tip line interrupted, is out of the circuit. If it should go off-hook, it does not come on to the circuit.

When the first instrument has completed its call, and goes back on-hook, the connection between the tip end the ring is broken and the current through the coils of the previously energized relay is terminated and its contact returns to the normally closed position, thus opening up the telephone line to either of the instruments connected in parallel on the line.

In an alternate embodiment, the telephone line exclusion device is connected in series with one of its outputs such that more than two telephones or other instruments may be connected in parallel upon a single incoming telephone line.

In use, usual telephone type jacks and plugs are attached to the line so that the device may be readily available and conform with the types of connectors commonly in use on the telephone line system.

Accordingly, it is an object of the present invention to provide automatic means by which a pair of telephones or other instruments upon a single telephone line provides uninterrupted connection for the first used instrument on the telephone line and automatically excludes the other telephone or other instrument on the line from use during the period of use by the first used telephone.

It is another object of the subject invention to provide means which, after the first telephone or other instrument has completed its call, the telephone line is restored to its original quiescent condition in order that either of the pair of telephones or other instruments may then be used.

Other objects of the invention will in part be obvious and will in part appear hereinafter. The invention accordingly comprises the apparatus possessing the construction, combination of elements, and arrangement of parts which are exemplified in the following detailed disclosure and the scope of the Application of which will be indicated in the claims.

BRIEF DESCRIPTION OF THE DRAWINGS

For further understanding of the features and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
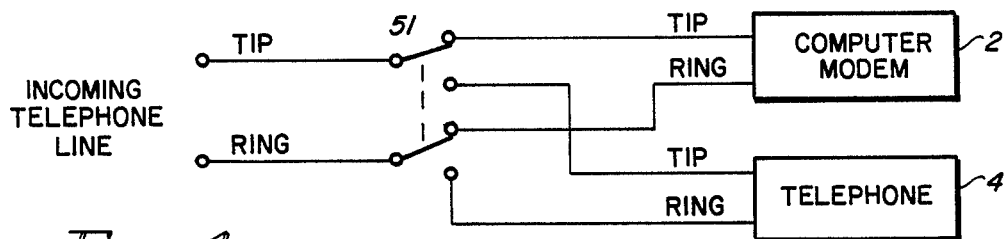
FIG. 1 is a partial schematic and partial block schematic diagram of the prior art.

Referring now to FIG. 1, a partial schematic and partial block schematic diagram is shown of the prior art presently used to exclude second parties from coming on to a telephone line while the same line is being used by another instrument, such as a telephone or computer modem. Presently, a ganged double pole switch S1 is used which allows the computer modem, for example, to be switched on to the incoming telephone line and thereby exclude the telephone or other device which normally uses the same telephone line. These switches work well, as they do prevent a person other than the person operating the computer modem from coming on the line and creating extraneous electrical signals which can harm the computer modem or distort the data that is being transmitted or received. The difficulty with the prior art is that it always does require the person operating the computer, or the telephone, to remember to place the switch in the correct position for whatever instrument is being operated. This may entail for a party seeking to use the telephone to go into another room where the computer modem is located to operate the switch since in most cases the switch is kept by the computer modem. In addition, as explained prior, having both the computer modem and the telephone on the same line without switch S1 serves to create utter havoc if, for example, the party picks up the telephone while data is being transmitted to or from the modem.

In the FIG. 1, the switch S1 is set to selectively direct both the tip line 6 and the ring line 8 to each of the blocks, namely the computer modem 2 and the telephone 4.

Figure 2:
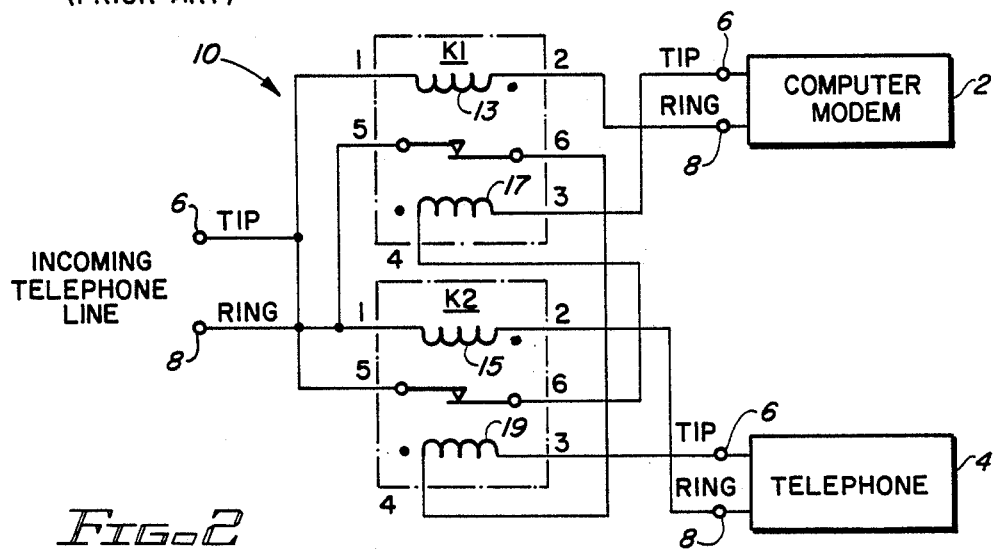
FIG. 2 is a complete schematic diagram of the subject invention connected to instruments on the incoming telephone line.

Referring now to FIG. 2, the subject line excluding device 10 is detailed showing the circuit and components operably interfaced between the computer modem 2, the telephone 4, and the incoming telephone lines. The positive tip line 6 and negative ring line 8 of both the incoming telephone lines entering device 10 and entering the computer modem and the telephone are illustrated. As can be seen, normally closed telephone type reed relays K1 and K2 with contact opening coils are utilized to prevent either the computer modem 2 or the telephone 4 from coming upon the telephone line while the other instrument is operating. The relays are identical and each have two polarized coils which both must be operating in series aided configuration with positive dc voltage connected to the dotted side of the coil in order that the generated magnetic flux is in the correct direction to cause the relay contacts to go from the normally closed position to an open position. This means that current must be going through each coil in the same direction as determined by the dots proximate each coil.

As detailed in FIG. 2, of the incoming telephone lines, tip side 6 is directed to pin 5 of both relays K1 and K2, pin 5 being one side of the normally closed contacts. Thereafter, the other side of the normally closed contacts, namely pin 6, is directed to the second relay coil of the opposite relay, i.e., pin 6 of relay K1 is directed to pin 4 of the second coil 19 of K2, and pin 6 of relay K2 is directed to pin 4 of the second coil 17 of relay K1. Both of these connections are to the dotted or positive side of each coil. Continuing, the other side of the second coil of each relay, pin 3, is then continued to the tip line 6 connected to the computer modem 2 and telephone 4, i.e., the output of second coil 17 of relay K1 is directed to the tip line 6 of computer modem 2 and the output of second coil 19 of relay K2 is directed to the tip line 6 of telephone 4. With respect to the ring line, incoming telephone line ring line 8 is simultaneously directed to the first coil of each of the relays, i.e., the side opposite the dot of first coil 13 of relay K1 and first coil 15 of relay K2. This corresponds to pin 1 on each relay. Since the ring line is the negative side or return of the incoming telephone line, it does not connect to the dotted side of the relay coils. Thereafter, the dotted side of the first coil of each relay is then directed to the ring line of the computer modem and the telephone, i.e., the dotted side of first coil 13 of relay K1 is directed to the ring line of computer modem 2 and the dotted side of first coil 15 is directed to the ring line 8 of telephone 4. This corresponds to pin 2 of each relay coil.

It is noted that each of the coils in each relay are connected in series through the tip and ring lines of one of the two instruments on the line while the normally closed contact is in the circuit of the opposite relay. Thus, completing the tip and ring line circuit for, as an example, the computer modem, essentially opens the normally closed contacts for the other instruments, namely the telephone.

The circuit operates as follows. If the computer modem goes on the line, it closes the circuit between the tip and ring lines at which time current flows from the incoming telephone line tip side 6 through the normally closed contacts of relay K2, pins 5 and 6, to second coil 17 of relay K1 (pins 4 and 3) and on to the tip line 6 of computer modem 2. At the same time, the ring line 8 circuit is completed in its connection to first coil 13 of relay K1 (pins 1 and 2) and to the ring line 8 of computer modem. At that point in time, relay K1, having both first and second coils 13 and 17 energized, and with the current flowing from tip (+) to ring (−) correctly through coils 13 and 17, breaks the normally closed contact between pins 5 and 6 or relay K1, and thus the tip line 6 to the telephone is opened, disabling use of the telephone. So long as the computer modem is off hook, it closes the circuit between its' tip and the ring lines, and current will continue to flow through coils 13 and 17 of relay K1 and thus keep contacts between pins 5 and 6 open, constantly inhibiting the use of the telephone. It is noted that the first and second coils of relay K1 are connected in the series aided configuration shown by the dots so that current flow is in the correct direction and the coils do not oppose each other.

When the computer modem goes off line, i.e., goes on-hook (no longer being used), the electrical connection between the tip line 6 and ring line 8 is broken, current ceases to flow, and relay contacts of relay K1 between pins 5 and 6 return to the normally closed position, thus placing both the computer modem and the telephone into a quiescent state where the first person to operate either one then proceeds to again exclude the other.

For the telephone to operate, i.e., go off-hook, and assuming that the computer modem is not already operating, the tip line 6 and ring line 8 into the telephone is closed. This then permits current to flow on the tip side 6 of the incoming telephone line through the normally closed contacts of relay K1, pins 5 and 6, and through second coil 19 of relay K2. Further, the ring line 8 circuit is completed through first coil 15 of relay K2 from telephone 4 to the incoming telephone line. Thus, first and second coils 15 and 19, being energized correctly in the series aided configuration, results in the normally closed contacts between pins 5 and 6 of relay K2 opening resulting in an open line connecting second coil 17 of relay K1 and thus preventing the computer modem 2 from going on line.

When the telephone hangs up and goes on hook, the electrical connection between the tip line 6 and the ring line 8 at the telephone is broken, and thus current is prohibited from flowing through first coil 15 and second coil 19 of relay K2 which allows the contacts of the relay K2 (pins 5 and 6) to return to the normally closed position.

If one is to follow current flowing, say from tip to ring on the incoming telephone line, it is quickly seen that the flow of current through the coils is additive, in accordance with the polarity of the coils such that both coils operate to increase the magnetic flux opening the reed relay contacts, and the coils do not oppose each other such as to cancel each other.

Figure 3:
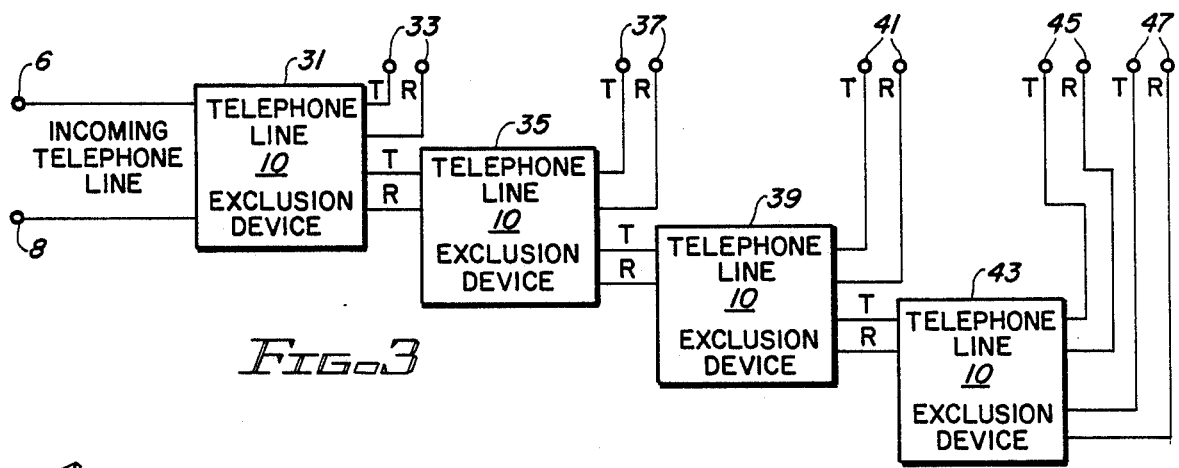
FIG. 3 is an alternate embodiment of the invention showing connection of more than two telephones or other instruments on a single incoming telephone line.

In order to apply the invention to the situation where more than two telephones or other devices are attached to a common incoming telephone line, an arrangement similar to that shown in FIG. 3 is utilized. Since the construction of the basic device affords operation for only two parallel telephones or the like, a first telephone line excluding device 10, characterized by the Numeral 31 in FIG. 3, receives the tip line 6 and ring line 8 of the incoming telephone line. One of the two outlets of the line excluding device is immediately made available for attachment to whatever telephone line instrument is desired. That is shown as the "T" and "R" (tip and ring) terminals 33. The second set of tip and ring lines from the first situated device 31 leads to the input for the second line excluding device 35. Here the first set of tip and ring lines emerge to terminals 37 and the second set to the following line excluding device 39. This scenario is repeated until all desired pair of tip and ring lines are available for connection to the devices operating on the telephone line. As shown in FIG. 3, four line excluding devices permit a total of five telephones or other instruments connected to the tip and ring lines.

With the above interconnection, and instrument on any one of the tip-ring pairs (33, 37, 41, 45, and 47) being used would inhibit use by any other instrument on any other tip-ring line.

Figure 4:
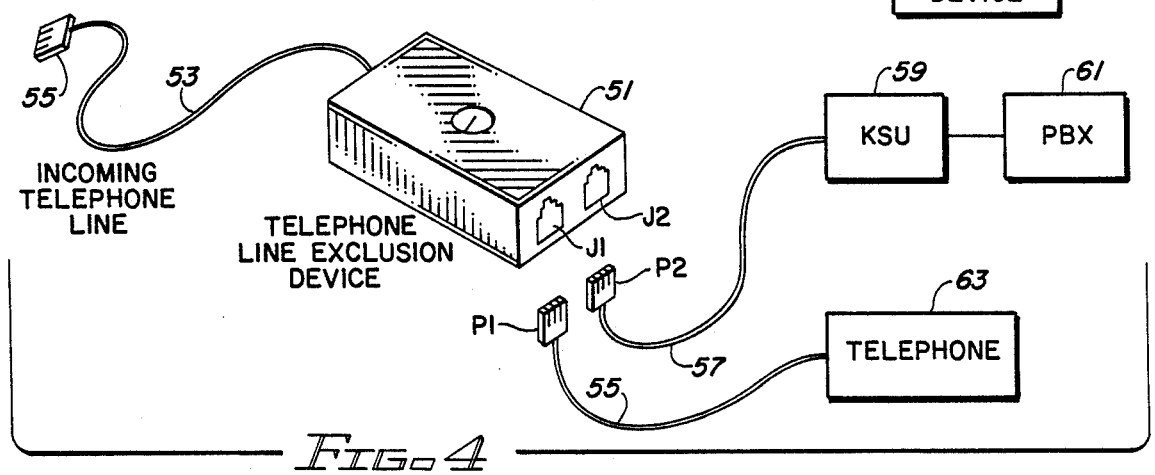
FIG. 4 is a partial perspective view and schematic block diagram view showing the invention situated in a container with the normally used plugs and connectors and interfaced between the incoming telephone line and a pair of telephones or other instruments.

Lastly, referring to FIG. 4, a typical installation is shown wherein the subject invention, the telephone line excluding device 10 (not shown) is encased in a container 51 where, emerging from the left hand end is the tip and ring lines (shown as one bundled line 53) terminated with a standard telephone type RJ-11 type plug 55. This connects to the incoming telephone line. At the opposite end of container 51 housing the line excluding device are a pair of jacks, labeled J1 and J2. These jacks are adapted to receive the tip and ring line pairs, shown as individually bundled wires terminating with plugs P1 and P2. Again, the standard RJ-11 type plugs are suggested for the connectors P1 and P2, the plugs P1 and P2 adapted to be joined to the jacks J1 and J2. At the opposite ends of the lines 55 and 57, each of which contain one tip and one ring line, are the various types of equipment which may be attached to telephone lines. For example, block 59 may represent the key service unit (KSU) normally utilized by the telephone companies for multi-line PBX's or terminals. The PBX system or multi-line terminal is represented by block 61. Similarly, line 55 which connects P1 to the other device residing on the telephone line, is represented by block 63. Block 63 then may be a pay telephone, a standard telephone, a computer modem, or as desired.

In all cases, use of one of the pair of tip and ring lines in cables 55 or 57 will inhibit the use of the lines by the other.

In the construction of the subject invention, the reed relay which has been utilized is a reed relay manufactured by the Wabash Relay And Electronics, Inc., company, a subsidiary of Wabash Magnetics, Inc., of Wabash, Ind., and more particularly, its Model 1670-4-3 relay. This relay conforms with the FCC Part 68 requirements and is characterized by normally closed contacts which open when a current of 18 ma. flows in the correct direction (entering the dotted side) through the series aided configured coils and once opened, will drop out (close) when the current drops to 6 ma. Further, the coil resistance of each coil is 20 ohms, and the unit provides 1500 volts dc coil to contact isolation as required. Although the subject invention does insert resistance into the telephone lines, nominally 20 ohms into each line for a total of 40 ohms, yet that is less than 10% of the normal resistance placed across the tip and ring lines by the telephone or modem and as such, does not degrade the quality of the transmission.

Although in the preferred embodiment of the device, together with an alternate embodiment, has been shown and described, it will be understood that there is no intent to limit the invention by such disclosure, but rather it is intended to cover all modifications and alternate constructions falling within the spirit and the scope of the invention as defined in the appended claims.

We claim:

1. A telephone line exclusion device interfacing between a single incoming telephone line, a first telephone line connected instrument, and a second telephone line connected instrument, said telephone line having a tip line and a ring line and each of said instruments having a tip line and ring line, the device permitting operation by the first of said two instruments to commence to use the incoming telephone line and excluding the second of the two instruments from use of the telephone line, the device comprising:

a first relay operably connected to said incoming telephone line and to first telephone connected instrument, said first relay having a set of contacts, and first coil and a second coil operating upon said first relay contacts;

a second relay operably connected to said incoming telephone line, to said first relay, and to said second telephone line connected instrument, said second relay having a set of contacts, and a first coil and a second coil operating upon said second relay contacts;

said first relay and said second relay contacts connected to said incoming telephone line tip line, said first relay and said second relay first coil connected to said incoming telephone line ring line, said first relay contacts also connected to said second relay second coil, and said second relay contacts also connected to said first relay second coil;

said first coil and said second coil of said first relay connected to said first telephone line connected instrument ring line and tip line respectively; and said first coil and said second coil of said second relay connected to said second telephone line connected instrument ring line and tip line respectively;

said first relay operating when said first telephone line connected instrument uses said incoming telephone line by energizing said first coil and said second coil of said first relay to operate upon said first relay contacts to exclude said second telephone line instrument from said incoming telephone line; and said second relay operating when said second telephone line connect instrument uses said incoming telephone line by energizing said first coil and said second coil of said second relay to operate upon said second relay contacts to exclude said first telephone line connected instrument from said incoming telephone line whereby the first of the two telephone line connected instruments to be used conducts current through both coils of the relay it is connected to and operates upon said relay's contacts, and the other telephone line connected instrument is thereby excluded from coming onto the incoming telephone line.

2. The telephone line exclusion device as defined in claim 1 wherein each said first coil and second coil of said first relay, and each said first coil and second coil of said second relay are polarized.

3. The telephone line exclusion device as defined in claim 2 wherein said first coil and second coil of said first relay, and said first Coil and second coil of said second relay are each operably connected in series aiding configuration whereby the coils of each relay are energized in a polarized series aided configuration to operate upon said contacts of each relay.

4. The telephone line exclusion device as defined in claim 3 further including a plug, said plug having a tip line and a ring line connected thereto, said plug tip line connected to said contacts of both said first relay and second relay, and said plug ring line attached to said first coil of both said first relay and second relay, and a first jack and second jack, both said jacks having a tip line and a ring line, said first jack tip line connected to said first relay second coil and said first jack ring line connected to said first relay first coil, and said second jack tip line connected to said second relay second coil and said second jack ring line connected to said second relay first coil, said plug adapted to be connected to said incoming telephone line, and said first jack and second jack adapted to be connected to said first telephone line type connected instrument and said second telephone line type connected instrument respectively.

5. The telephone line exclusion device as defined in claim 4 wherein said plug is defined by an RJ-11 type plug, and said jacks are defined by jacks receptive to an RJ-11 type plug.

6. The telephone line exclusion device as defined in claim 3 wherein said first and second relay are defined by reed relays.

7. The telephone line exclusion device defined in claim 3 wherein said first relay and said second relay are defined by relays having normally closed contacts when said coils are not operating upon said contacts.

8. The telephone line exclusion device as defined in claim 3 wherein said first telephone line connected instrument is defined by a computer modem and said second telephone line type connected instrument is defined by a telephone.

9. The telephone line exclusion device as defined in claim 3 wherein said first telephone line type connected instrument is defined by a key service unit with connecting exchange and telephones, and said second telephone line connected instrument is defined by a telephone.

10. The telephone line exclusion device as defined in claim 3 wherein said second telephone line connected instrument is wherein a second telephone line exclusion device, and wherein:

said second telephone line exclusion device is adapted to be connected to a third telephone line type connected instrument and to a fourth telephone line type connected instrument whereby a plurality of telephone line exclusion devices may be utilized to connect to plurality greater than two of telephone line type connecting instruments.

* * * * *